US012668091B2

(12) United States Patent
Son

(10) Patent No.: US 12,668,091 B2
(45) Date of Patent: Jun. 30, 2026

(54) HYDRAULIC VEHICLE HEIGHT ADJUSTMENT DEVICE

(71) Applicant: HYUNDAI MOBIS CO., LTD., Seoul (KR)

(72) Inventor: Hee Hoon Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 272 days.

(21) Appl. No.: 18/213,635

(22) Filed: Jun. 23, 2023

(65) Prior Publication Data

US 2024/0001726 A1      Jan. 4, 2024

(30) Foreign Application Priority Data

Jul. 4, 2022    (KR) ........................ 10-2022-0081806
Jul. 4, 2022    (KR) ........................ 10-2022-0081807
Jul. 4, 2022    (KR) ........................ 10-2022-0081808

(51) Int. Cl.
*B60G 17/015*        (2006.01)
*B60G 17/052*        (2006.01)
*B60G 17/056*        (2006.01)

(52) U.S. Cl.
CPC ..... *B60G 17/0157* (2013.01); *B60G 17/0155* (2013.01); *B60G 17/0525* (2013.01); *B60G 17/0565* (2013.01); *B60G 2500/30* (2013.01)

(58) Field of Classification Search
CPC ........... B60G 17/0157; B60G 17/0155; B60G 17/0525; B60G 17/0565; B60G 2500/30
USPC .......................................................... 701/37
See application file for complete search history.

(56) References Cited

FOREIGN PATENT DOCUMENTS

DE          19921648 A1 * 11/2000   ......... B60G 17/0152
KR      10-1013977 B1      2/2011
KR      20190010159 A  *    1/2019   ............. B62D 5/062

* cited by examiner

*Primary Examiner* — Lindsay M Low
*Assistant Examiner* — Omar Morales
(74) *Attorney, Agent, or Firm* — Morgan, Lewis & Bockius LLP

(57)                ABSTRACT

The present disclosure relates to a hydraulic vehicle height adjustment device including a storage tank part configured to store a fluid, a housing part connected to the storage tank part and configured to define a flow path portion through which the fluid moves, a gear pump part inserted into the housing part and having gears configured to press the fluid, an electric motor part mounted on the housing part and configured to operate the gear pump part when electric power is applied, an adjustment part connected to the housing part and configured to change a height of a vehicle body by using hydraulic pressure, and a pulsation reducing part inserted into the housing part, connected to the flow path portion, and configured to maintain a constant movement amount of the fluid.

18 Claims, 12 Drawing Sheets

HYDRAULIC VEHICLE HEIGHT ADJUSTMENT DEVICE

CROSS-REFERENCE TO RELATED APPLICATION

This application claims priority from and the benefit of Korean Patent Application Nos. 10-2022-0081808, 10-2022-0081807, and 10-2022-0081806, filed on Jul. 4, 2022, which are hereby incorporated by reference for all purposes as if set forth herein.

BACKGROUND

Field

Exemplary embodiments of the present disclosure relate to a hydraulic vehicle height adjustment device, and more particularly, to a hydraulic vehicle height adjustment device in which when electric power is applied to a motor, a gear pump supplies hydraulic pressure, thereby adjusting a height of a vehicle and reducing noise.

Discussion of the Background

In general, a suspension system improves ride quality and stability of a vehicle by mitigating impact or vibration transmitted from a road surface while the vehicle travels. The suspension system includes a chassis spring, a shock absorber configured to improve ride quality by controlling inherent vibration of the chassis spring, and a stabilizer configured to prevent rolling of the vehicle.

In the suspension system of the vehicle in the related art, when an electronic control unit generates a control signal, a compressor compresses air and supplies the air to a bellows-type air spring fixed to a vehicle body. The bellows-type air spring adjusts a vehicle height by using pressure of air supplied from the compressor.

Meanwhile, recently, a hydraulic device has been used to adjust a vehicle height. To supply hydraulic pressure, the hydraulic device requires a reservoir configured to store oil, an oil pump configured to produce hydraulic pressure, a power source configured to operate the oil pump, and valve blocks configured to operate a hydraulic circuit. The respective constituent components are operated by being connected by pipes configured to transmit hydraulic pressure, and wires configured to transmit and receive signals.

However, in the related art, there is a problem in that noise and pulsation occur during the process of operating the cylindrical oil pump. Accordingly, there is a need to solve the problem.

The background technology of the present disclosure is disclosed in Korean Patent No. 10-1013977 (registered on Feb. 1, 2011 and entitled 'Apparatus for Adjusting Vehicle Height of Vehicle').

SUMMARY

Various embodiments are directed to a hydraulic vehicle height adjustment device in which when electric power is applied to a motor, a gear pump supplies hydraulic pressure, thereby adjusting a height of a vehicle and reducing noise.

In an embodiment, a hydraulic vehicle height adjustment device includes: a storage tank part configured to store a fluid; a housing part connected to the storage tank part and configured to define a flow path portion through which the fluid moves; a gear pump part inserted into the housing part and having gears configured to press the fluid; an electric motor part mounted on the housing part and configured to operate the gear pump part when electric power is applied; an adjustment part connected to the housing part and configured to change a height of a vehicle body by using hydraulic pressure; and a pulsation reducing part inserted into the housing part, connected to the flow path portion, and configured to maintain a constant movement amount of the fluid.

The housing part may include: a block body portion; a tank port portion in an upper surface portion of the block body portion and configured to guide a connection with the storage tank part; an adjustment port portion in the upper surface portion of the block body portion and configured to guide a connection with the adjustment part; a pump port portion in a front surface portion of the block body portion and configured to guide the insertion of the gear pump part; and one or more pulsation port portions in the block body portion and configured to guide the insertion of the pulsation reducing part.

The hydraulic vehicle height adjustment device may further include a control part mounted on the housing part. The housing part may further include a connection port portion through the block body portion and configured to guide a direct connection between the electric motor part and the control part.

The gear pump part may include: a pump body portion inserted into the housing part; a motor gear part rotatably mounted in the pump body portion and configured to rotate by being connected to the electric motor part; a connection gear part rotatably mounted in the pump body portion and configured to rotate while engaging with the motor gear part; a pump inlet portion in the pump body portion and configured to guide the fluid to the motor gear part and the connection gear part; and a pump outlet portion in the pump body portion and configured to guide the fluid discharged from the motor gear part and the connection gear part.

The gear pump part may further include a pair of pump sealing parts mounted on an outer portion of the pump body portion and configured to maintain sealability, and the pump outlet portion may be disposed between the pair of pump sealing parts.

The pulsation reducing part may include: a reduction insertion part inserted into the housing part and configured to mitigate fluid impact while guiding the fluid, which is introduced into a pulsation inlet portion, to a pulsation outlet portion; and a reduction support part mounted on the housing part and configured to support the reduction insertion part.

The reduction insertion part may include: an insertion pipe portion inserted into the housing part and configured to guide the fluid, which is introduced from the pulsation inlet portion, into the insertion pipe portion; an insertion catching portion protruding outward from the insertion pipe portion and caught in the housing part; and one or more insertion discharge portions in the insertion pipe portion and configured to allow the fluid, which is introduced into the insertion pipe portion, to pass through the insertion pipe portion to the outside of the insertion pipe portion.

An inner diameter of the insertion pipe portion may be designed to be larger than a hole diameter of the pulsation inlet portion.

At least one of the one or more insertion discharge portions may be opposite to the pulsation outlet portion.

In another embodiment, a hydraulic vehicle height adjustment device includes: a storage tank part configured to store a fluid; a gear pump part connected to the storage tank part and having gears configured to operate to press the fluid; a pulsation reducing part configured to maintain a constant movement amount of the fluid discharged from the gear pump part; and an adjustment valve part connected to the pulsation reducing part and configured to control a movement amount of the fluid to an adjustment part for changing a height of a vehicle body.

The pulsation reducing part may be provided as a plurality of pulsation reducing parts connected in series.

The hydraulic vehicle height adjustment device may further include: a check valve part disposed between the pulsation reducing part and the gear pump part and configured to control the movement amount of the fluid.

The hydraulic vehicle height adjustment device may further include: a recovery portion configured to guide the fluid, which has passed through the pulsation reducing part, to the storage tank part; and a vehicle height valve part configured to open or close the recovery portion.

In a vehicle height raising mode, the vehicle height valve part may restrict the movement of the fluid, and the check valve part and the adjustment valve part may allow the movement of the fluid.

In a vehicle height lowering mode, the check valve part may restrict the movement of the fluid, and the vehicle height valve part and the adjustment valve part may allow the movement of the fluid.

In a vehicle height maintaining mode, the check valve part and the vehicle height valve part may allow the movement of the fluid, and the adjustment valve part may restrict the movement of the fluid.

In still another embodiment, a hydraulic vehicle height adjustment device includes: a storage tank part configured to store a fluid; a housing part connected to the storage tank part and having a flow path portion through which the fluid moves; a gear pump part inserted into the housing part and having gears configured to press the fluid; an electric motor part mounted on the housing part and configured to operate the gear pump part when electric power is applied; a valve part inserted into the housing part and configured to open or close the flow path portion; and a control part mounted on the housing part and configured to operate the valve part.

The housing part may include: a block body portion; a tank port portion in an upper surface portion of the block body portion and configured to guide a connection with the storage tank part; an adjustment port portion in the upper surface portion of the block body portion; a pump port portion in a front surface portion of the block body portion and configured to guide the insertion of the gear pump part; one or more valve port portions in the block body portion and configured to guide the insertion of the valve part; and a connection port portion through the block body portion and configured to guide a direct connection between the electric motor part and the control part.

The gear pump part may include: a pump body portion inserted into the housing part; a motor gear part rotatably mounted in the pump body portion and configured to rotate by being connected to the electric motor part; a connection gear part rotatably mounted in the pump body portion and configured to rotate while engaging with the motor gear part; a pump inlet portion in the pump body portion and configured to guide the fluid to the motor gear part and the connection gear part; a pump outlet portion in the pump body portion and configured to guide the fluid discharged from the motor gear part and the connection gear part; and a pair of pump sealing parts mounted on an outer portion of the pump body portion and configured to maintain sealability, and the pump outlet portion may be disposed between the pair of pump sealing parts.

The hydraulic vehicle height adjustment device may further include: an adjustment part connected to the housing part and configured to change a height of a vehicle body by using hydraulic pressure. The adjustment port portion may be configured to guide a connection with the adjustment part.

According to the hydraulic vehicle height adjustment device according to the present disclosure, the fluid stored in the storage tank part may be amplified by the gear pump part and then supplied to the adjustment part, thereby adjusting the height of the vehicle body and suppressing the occurrence of noise during the operating process.

BRIEF DESCRIPTION OF THE DRAWINGS

FIG. 11 is a view schematically illustrating a flow of the fluid in a vehicle height lowering mode in FIG. 9.

FIG. 12 is a view schematically illustrating a flow of the fluid in a vehicle height maintaining mode in FIG. 9.

DETAILED DESCRIPTION OF THE ILLUSTRATED EMBODIMENTS

Figure 1:
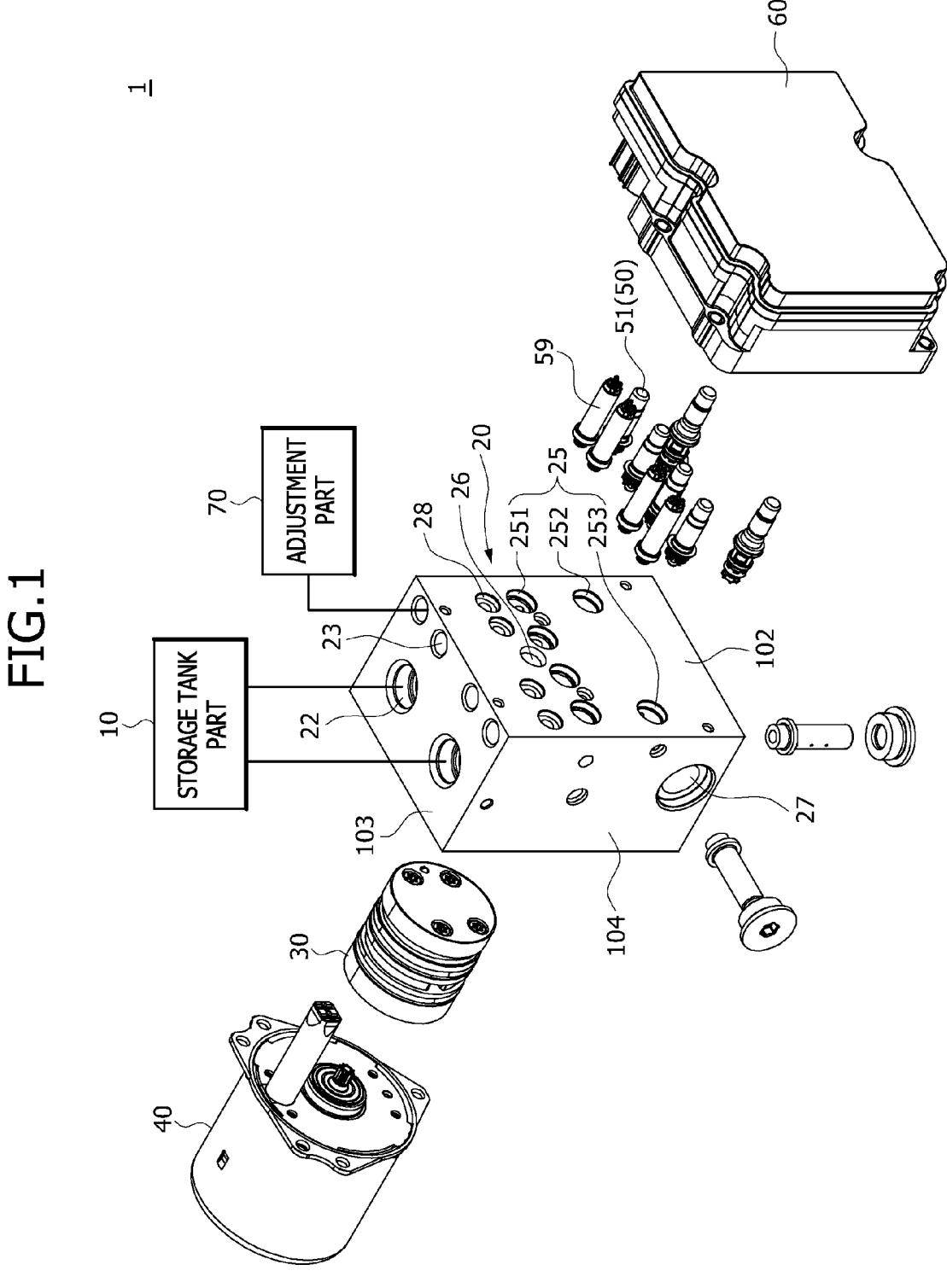
FIG. 1 is an exploded perspective view schematically illustrating a hydraulic vehicle height adjustment device according to an embodiment of the present disclosure.

Hereinafter, a hydraulic vehicle height adjustment device will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

FIG. 1 is an exploded perspective view schematically illustrating a hydraulic vehicle height adjustment device according to an embodiment of the present disclosure. With reference to FIG. 1, a hydraulic vehicle height adjustment device 1 according to the embodiment of the present disclosure may include a storage tank part 10, a housing part 20, a gear pump part 30, an electric motor part 40, a valve part 50, a control part 60, and an adjustment part 70.

The storage tank part 10 stores a fluid. For example, the storage tank part 10 may be mounted on a vehicle body and connected to the housing part 20 through a hydraulic pipe.

The housing part 20 may be connected to the storage tank part 10 and have a flow path portion 90 through which the fluid flows. For example, the flow path portion 90 may be formed in the housing part 20. The gear pump part 30 and the valve part 50 may be inserted into the housing part 20 and connected to the flow path portion 90.

The gear pump part 30 is inserted into the housing part 20. Gears rotate to press the introduced fluid and discharge the fluid with increased pressure. For example, the gear pump part 30 may provide noise with a frequency relatively higher than that of noise of a hydraulic cylinder, which may prevent amplification with noise of the vehicle body.

The electric motor part 40 may be mounted on the housing part 20 and operate the gear pump part 30 when electric power is applied. For example, the electric motor part 40 may be coupled to a front surface portion 101 of the housing part 20 and spline-coupled to the gear pump part 30, such that the electric motor part 40 may transmit power.

The valve part 50 may be inserted into the housing part 20 and open or close the flow path portion 90. For example, the valve part 50 may be provided as a plurality of valve parts 50 mounted in the housing part 20 to conform to the functions and selectively open or close the flow path portion 90. The plurality of valve parts 50 may be inserted into a rear surface portion 102 of the housing part 20.

The control part 60 may be mounted on the housing part 20 and control the valve part 50. For example, the control part 60 may be mounted on the rear surface portion 102 of the housing part 20 and connected to the valve parts 50, such that the control part 60 may control the valve parts 50.

The adjustment part 70 may be connected to the housing part and change a vehicle body height by using hydraulic pressure. For example, the adjustment part 70 may be mounted on the vehicle body and support each wheel. When the hydraulic pressure in the adjustment part 70 increases, a length of the adjustment part 70 may increase to raise the vehicle height. When the hydraulic pressure in the adjustment part 70 decreases, the length of the adjustment part may decrease to lower the vehicle height. Meanwhile, when the hydraulic pressure in the adjustment part 70 is kept constant, the length of the adjustment part 70 may not be changed, and the vehicle height may be kept constant. The adjustment part 70 may be connected to the housing part 20 through the hydraulic pipe.

Figure 2:
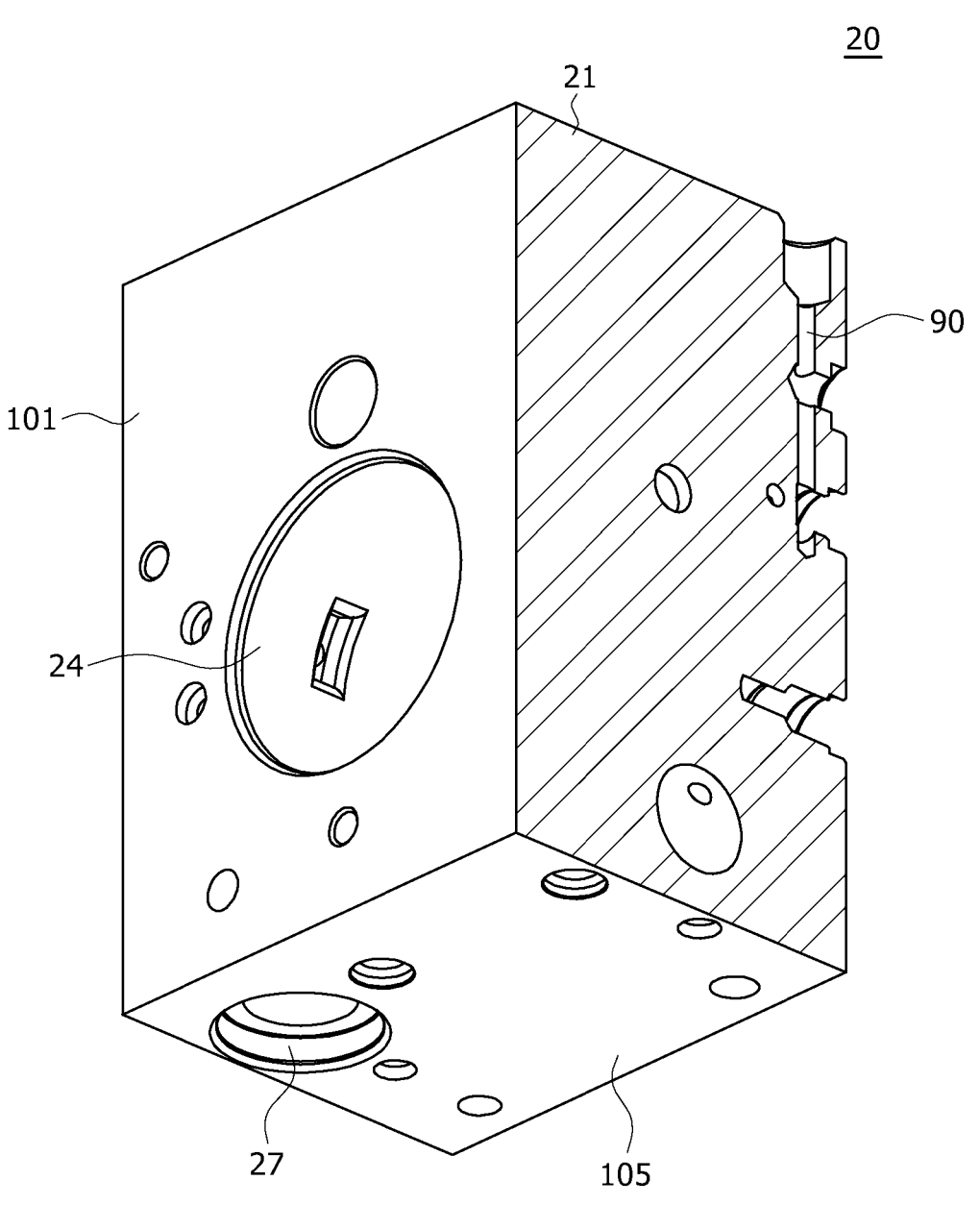
FIG. 2 is a front perspective view schematically illustrating a housing part according to the embodiment of the present disclosure.
Figure 3:
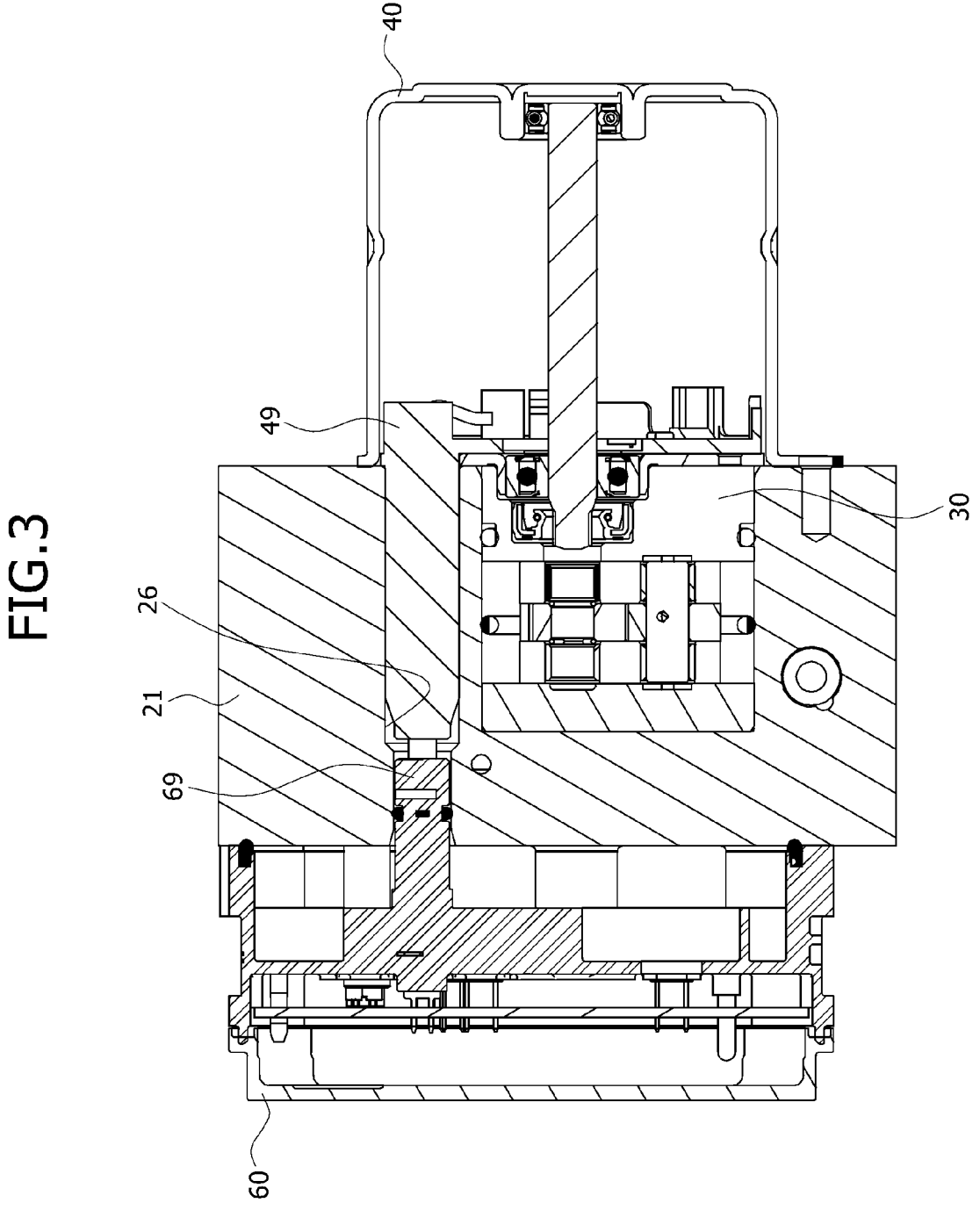
FIG. 3 is a cross-sectional view schematically illustrating the housing part according to the embodiment of the present disclosure.

FIG. 2 is a front perspective view schematically illustrating the housing part according to the embodiment of the present disclosure, and FIG. 3 is a cross-sectional view schematically illustrating the housing part according to the embodiment of the present disclosure. With reference to FIGS. 2 and 3, the housing part 20 according to the embodiment of the present disclosure may include a block body portion 21, tank port portions 22, adjustment port portions 23, a pump port portion 24, connection port portions 25, and a valve port portion 26.

The block body portion 21 may be manufactured by extrusion and may be a square block and made of a machined aluminum alloy. The flow path portion 90 may be formed in the block body portion 21 and guide the fluid. An outer portion of the block body portion 21 may include the front surface portion 101, the rear surface portion 102, an upper surface portion 103, a lateral surface part 104, and a bottom surface portion 105.

The tank port portion 22 may be formed in the upper surface portion 103 of the block body portion 21 and guide the connection with the storage tank part 10. For example, the tank port portion 22 may communicate with the flow path portion 90. The tank port portion 22 may be provided as a pair of tank port portions 22 disposed at two opposite left and right sides of the upper surface portion 103 and spaced apart from each other. In case that the tank port portion 22 is divided into two tank port portions, any one tank port portion may serve as a passageway through which the fluid stored in the storage tank part 10 is introduced, and the other tank port portion may serve as a passageway through which the fluid is discharged to the storage tank part 10. The hydraulic pipe may be inserted into the tank port portion 22 and guide the fluid.

The adjustment port portion 23 may be formed in the upper surface portion 103 of the block body portion 21 and guide the connection with the adjustment part 70. For example, the adjustment port portions 23 respectively may communicate with the flow path portion 90. The adjustment port portions 23 may be provided as four adjustment port portions 23 disposed in the upper surface portion 103 and spaced apart from one another. The hydraulic pipe may be inserted into the adjustment port portion 23 and guide the fluid.

The pump port portion 24 may be formed in the front surface portion 101 of the block body portion 21 and guide the insertion of the gear pump part 30. For example, the pump port portion 24 may communicate with the flow path portion 90, and the pressure of the fluid passing through the pump port portion 24 may be increased by the gear pump part 30.

The one or more valve port portions 25 may be formed in the block body portion 21 and guide the insertion of the valve part 50. For example, the plurality of valve port portions 25 may be formed in the rear surface portion 102, and the valve parts 50 may be respectively inserted into the plurality of valve port portions 25. The control part 60 coupled to the rear surface portion 102 may be connected to the valve parts 50.

The housing part 20 according to the embodiment of the present disclosure may further include a connection port portion 26. The connection port portion 26 may be formed through the block body portion 21 and guide the direct connection between the electric motor part 40 and the control part 60. For example, a motor junction portion 49 may be formed on the electric motor part 40 and inserted into the front surface portion 101. A control junction portion 69 may be formed on the control part 60 and inserted into the rear surface portion 102. The motor junction portion 49 and the control junction portion 69 may be connected to each other in the connection port portion 26.

Figure 4:
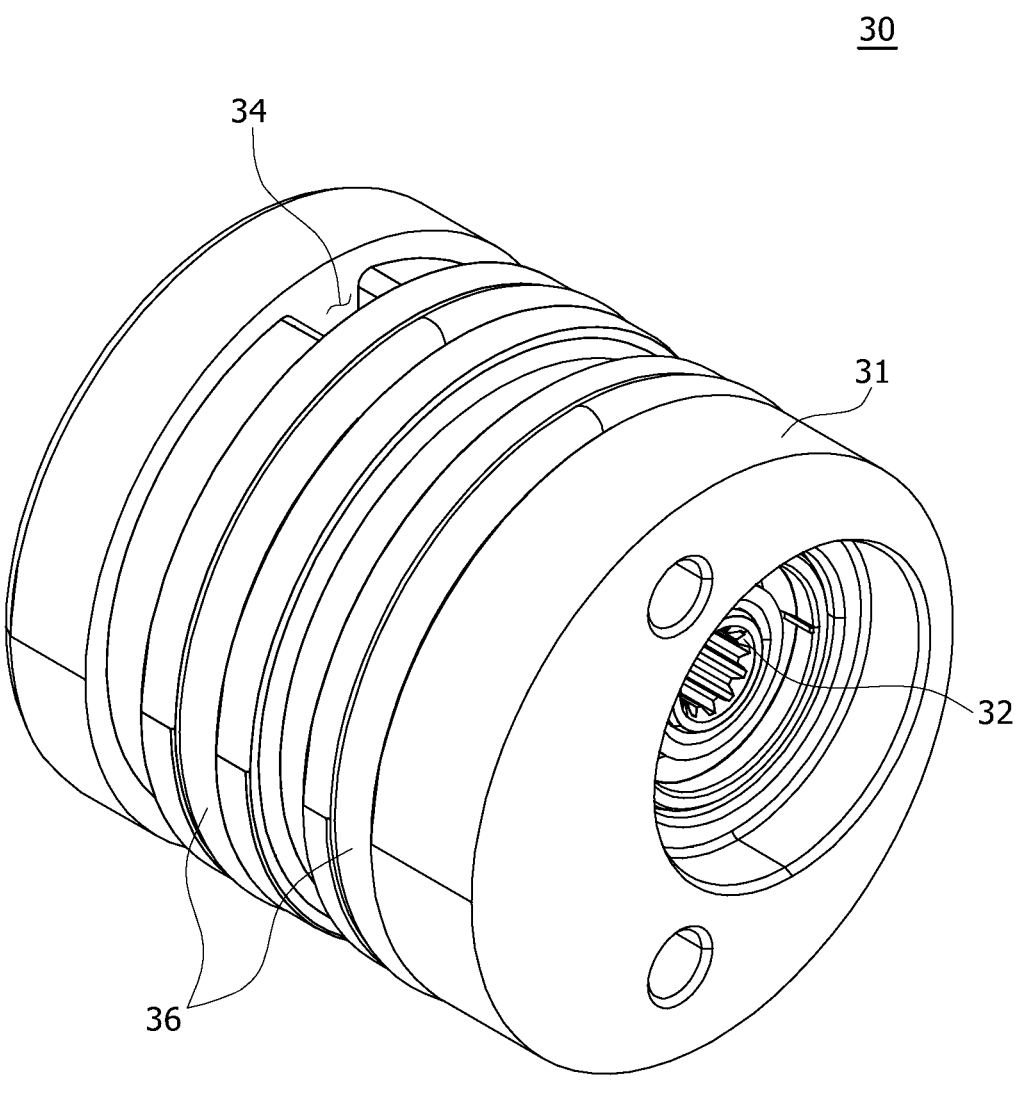
FIG. 4 is a view schematically illustrating a pump inlet portion formed in a gear pump part according to the embodiment of the present disclosure.
Figure 5:
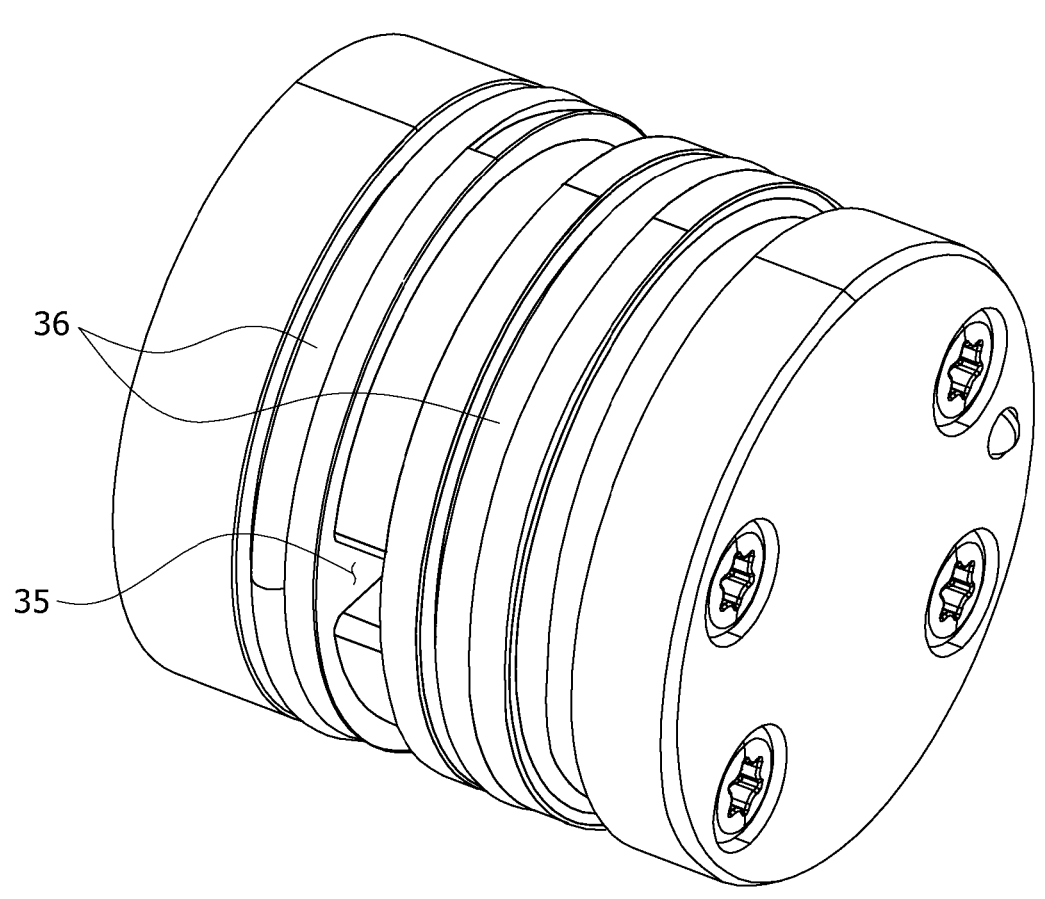
FIG. 5 is a view schematically illustrating a pump outlet portion formed in the gear pump part according to the embodiment of the present disclosure.
Figure 6:
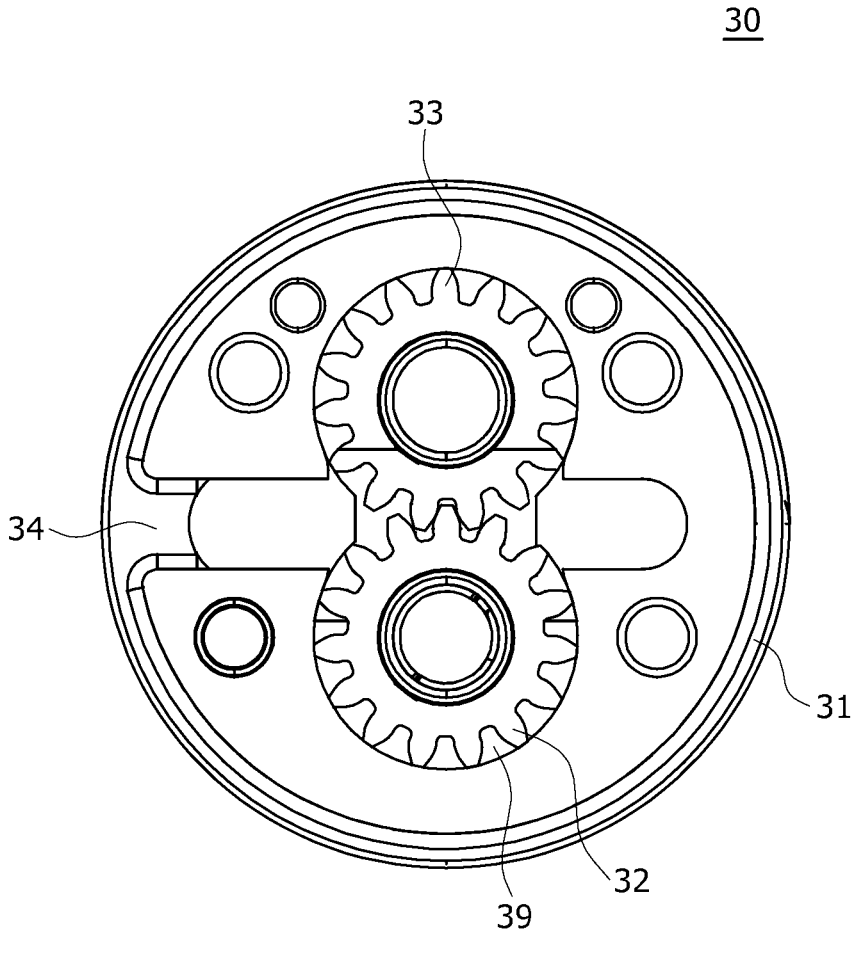
FIG. 6 is a cross-sectional view schematically illustrating the gear pump part according to the embodiment of the present disclosure.

FIG. 4 is a view schematically illustrating a pump inlet portion formed in the gear pump part according to the embodiment of the present disclosure, FIG. 5 is a view schematically illustrating a pump outlet portion formed in the gear pump part according to the embodiment of the present disclosure, FIG. 6 is a cross-sectional view schematically illustrating the gear pump part according to the embodiment of the present disclosure. With reference to FIGS. 4 to 6, the gear pump part 30 according to the embodiment of the present disclosure may include a pump body portion 31, a motor gear part 32, a connection gear part 33, a pump inlet portion 34, and a pump outlet portion 35.

The pump body portion 31 may be inserted into the housing part 20. For example, the pump body portion 31 may be inserted into the pump port portion 24. A chamber portion 39 may be formed in the pump body portion 31, and the motor gear part 32 and the connection gear part 33 may rotate in the chamber portion 39.

The motor gear part 32 may be rotatably mounted in the pump body portion 31 and rotate by being connected to the electric motor part 40. For example, the motor gear part 32 may be rotatably mounted in the chamber portion 39 of the pump body portion 31. A central shaft of the motor gear part 32 may be exposed to the outside of the pump body portion 31 and spline-coupled to a motor shaft of the electric motor part 40.

The connection gear part 33 may be rotatably mounted in the pump body portion 31 and rotate while engaging with the motor gear part 32. For example, the connection gear part 33 may be rotatably mounted in the chamber portion 39 of the pump body portion 31.

The pump inlet portion 34 may be formed in the pump body portion 31 and guide the fluid to the motor gear part 32 and the connection gear part 33. For example, the pump inlet portion 34 formed at an outer side of the pump body portion 31 may communicate with the chamber portion 39 of the pump body portion 31.

The pump outlet portion 35 may be formed in the pump body portion 31 and guide the fluid discharged from the motor gear part 32 and the connection gear part 33. For example, the pump outlet portion 35 formed at the outer side of the pump body portion 31 may communicate with the chamber portion 39 of the pump body portion 31. The pump outlet portion 35 may be disposed to be opposite to the pump inlet portion 34.

The gear pump part 30 according to the embodiment of the present disclosure may further include pump sealing parts 36. The pump sealing parts 36 may be provided as a pair of pump sealing parts 36 mounted at the outer side of the pump body portion 31 to maintain sealability. The pump outlet portion 35 may be disposed between the pair of pump sealing parts 36. For example, the pump sealing part 36 may be inserted into a portion recessed in an outer peripheral surface of the pump body portion 31. The pump sealing part 36 may be in close contact with the pump port portion 24 and prevent a leak of oil.

Meanwhile, the pressure of the fluid in the pump outlet portion may be higher than the pressure of the fluid in the pump inlet portion 34. However, when the gear pump part 30 is inserted into the pump port portion 26, the pump inlet portion 34 may be disposed in a deeper portion in the pump port portion 26 than the pump outlet portion 35. Further, the pump outlet portion 35 is disposed between the pump sealing parts 36, which may prevent a leak of oil and a free movement of the gear pump part 30 only by means of the pair of pump sealing parts 36.

Figure 7:
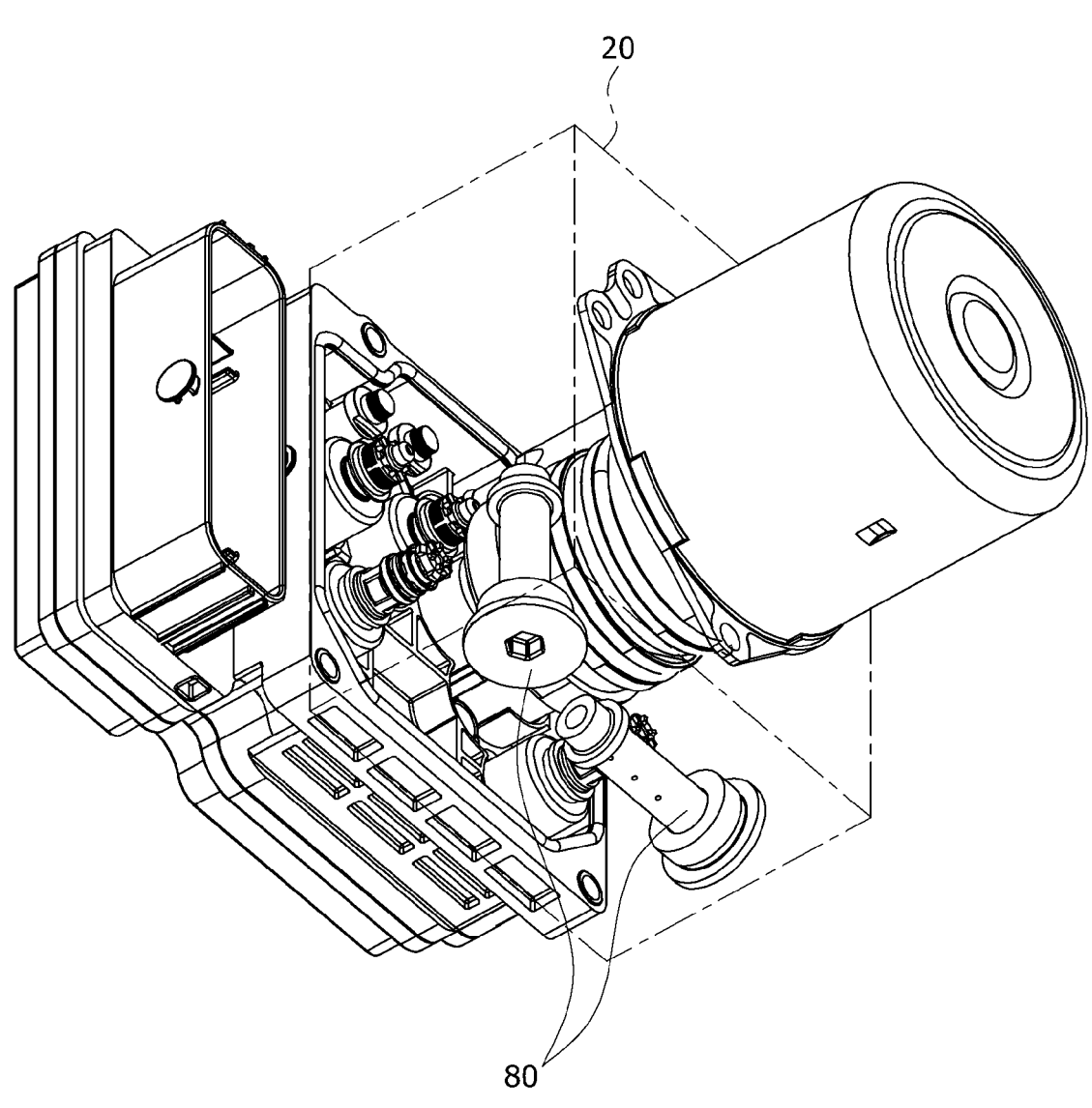
FIG. 7 is a view schematically illustrating pulsation reducing parts according to the embodiment of the present disclosure.

FIG. 7 is a view schematically illustrating pulsation reducing parts according to the embodiment of the present disclosure. With reference to FIG. 7, the hydraulic vehicle height adjustment device 1 according to the embodiment of the present disclosure may further include pulsation reducing parts 80.

The pulsation reducing part 80 according to the embodiment of the present disclosure may be inserted into the housing part 20 and connected to the flow path portion 90, such that the pulsation reducing part 80 may maintain a constant movement amount of the fluid. Therefore, it is possible to prevent vibration and noise caused by fluid impact during a process of adjusting the vehicle height.

Meanwhile, the housing part 20 may further include pulsation port portions 27 in which the pulsation reducing parts 80 are mounted. The one or more pulsation port portions 27 may be formed in the block body portion 21 and guide the insertion of the pulsation reducing parts 80. For example, the two pulsation port portions 27 may be respectively formed in the lateral surface part 104 and the bottom surface portion 105 of the block body portion 21 and communicate with the flow path portion 90.

Figure 8:
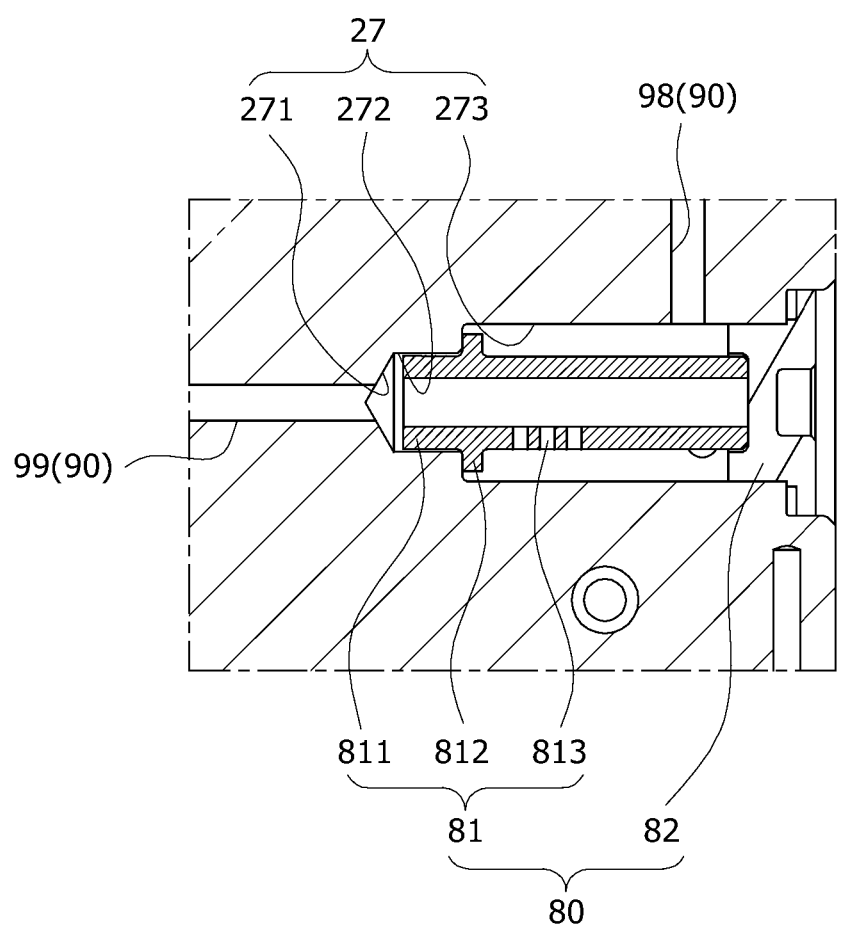
FIG. 8 is a cross-sectional view schematically illustrating a state in which the pulsation reducing part according to the embodiment of the present disclosure is inserted into the housing part.

FIG. 8 is a cross-sectional view schematically illustrating a state in which the pulsation reducing part according to the embodiment of the present disclosure is inserted into the housing part. With reference to FIG. 8, the pulsation reducing part 80 according to the embodiment of the present disclosure may include a reduction insertion part 81 and a reduction support part 82.

The reduction insertion part 81 may be inserted into the housing part 20 and guide the fluid, which is introduced into a pulsation inlet portion 99, to a pulsation outlet portion 98, thereby mitigating fluid impact. For example, the reduction insertion part 81 may be inserted into the pulsation port portion 27, and the pulsation inlet portion 99 and the pulsation outlet portion 98 may constitute a part of the flow path portion 90.

The reduction support part 82 may be mounted in the housing part 20 and support the reduction insertion part 81. For example, the reduction support part 82 may suppress a leak of oil by closing the pulsation port portion 27 and restrict a free movement of the reduction insertion part 81.

More specifically, the reduction insertion part 81 may include an insertion pipe portion 811, an insertion catching portion 812, and an insertion discharge portion 813. To mitigate pulsation of the fluid discharged through the reduction insertion part 81, the pulsation port portion 27 may include a first pulsation port portion 271, a second pulsation port portion 272, and a third pulsation port portion 273. The first pulsation port portion 271 may communicate with the pulsation inlet portion 99. A cross-section of the first pulsation port portion 271 is formed to be inclined, such that an inner diameter of the first pulsation port portion 271 may increase as the distance from the pulsation inlet portion 99 increases. The second pulsation port portion 272 may be formed at an end of the first pulsation port portion 271 and have a constant inner diameter. The third pulsation port portion 273 may extend from an end of the second pulsation port portion 272 and have a larger inner diameter than the second pulsation port portion 272. The third pulsation port portion 273 may communicate with the pulsation outlet portion 98.

The insertion pipe portion 811 may be inserted into the housing part 20 and guide the fluid, which is introduced from the pulsation inlet portion 99, into the insertion pipe portion 811. For example, the insertion pipe portion 811 may have a pipe shape and be in close contact with an inner peripheral surface of the second pulsation port portion 272. An O-ring may be disposed between the insertion pipe portion 811 and the second pulsation port portion 272 to maintain sealability. The insertion pipe portion 811 has a length so that the insertion pipe portion 811 is inserted into the second pulsation port portion 272 and the third pulsation port portion 273. The other end of the insertion pipe portion 811 may be in contact with the reduction support part 82 that closes the third pulsation port portion 273.

The insertion catching portion 812 may protrude outward from the insertion pipe portion 811 and be caught in the housing part 20. For example, the insertion catching portion 812 may be caught by a stepped portion formed by a difference in inner diameter between the second pulsation port portion 272 and the third pulsation port portion 273.

The insertion discharge portion 813 may be provided as one or more insertion discharge portions 813 formed in the insertion pipe portion 811. The insertion discharge portion 813 may allow the fluid, which is introduced into the insertion pipe portion 811, to pass through the insertion discharge portion 813 to the outside of the insertion pipe portion 811. For example, the insertion pipe portion 811 may be spaced apart from the third pulsation port portion 273 to define a space in which the fluid flows. The insertion discharge portion 813 may allow the fluid to be discharged to the space between the insertion pipe portion 811 and the third pulsation port portion 273.

In this case, an inner diameter of the insertion pipe portion 811 may be designed to be larger than a hole diameter of the pulsation inlet portion 99. That is, a fluid movement cross-sectional area of the insertion pipe portion 811 is designed to be larger than a fluid movement cross-sectional area of the pulsation inlet portion 99, which may reduce a pulsation of the fluid.

In addition, the insertion discharge portion 813 may be formed to be opposite to the pulsation outlet portion 98. For example, in case that the pulsation outlet portion 98 is disposed above the insertion pipe portion 811, the insertion discharge portion 813 may be formed in a lower portion of the insertion pipe portion 811. Therefore, the fluid passing through the insertion discharge portion 813 moves to the space formed outside the insertion pipe portion 811 and then moves to the pulsation outlet portion 98, which may reduce the pulsation of the fluid. In case that the pulsation outlet portion 98 is formed at the other end of the third pulsation port portion 273, the insertion discharge portion 813 may discharge the fluid to one end of the third pulsation port portion 273.

Figure 9:
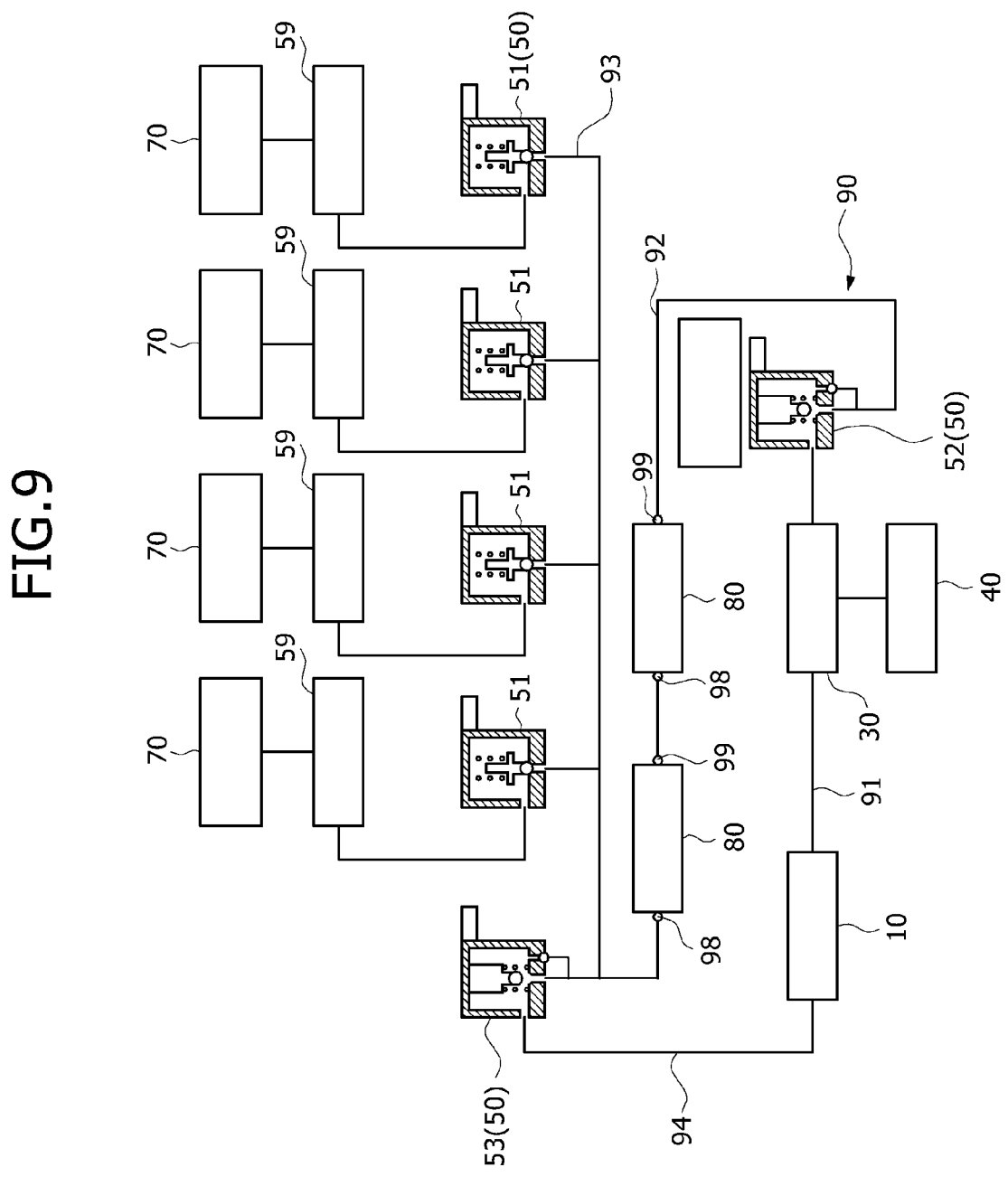
FIG. 9 is a view schematically illustrating a hydraulic circuit of the hydraulic vehicle height adjustment device according to the embodiment of the present disclosure.

FIG. 9 is a view schematically illustrating a hydraulic circuit of the hydraulic vehicle height adjustment device according to the embodiment of the present disclosure. With reference to FIG. 9, the fluid stored in the storage tank part 10 is increased in pressure by the gear pump part 30, and vibration noise is reduced as the fluid passes through the pulsation reducing part 80. The fluid selectively reaches the adjustment parts 70 through the valve parts 50 to change the vehicle height. The flow path portion 90, which connects the constituent elements and guides the fluid, may include a first flow path portion 91, a second flow path portion 92, and a third flow path portion 93. Further, the valve part 50 may include an adjustment valve part 51, a check valve part 52, and a vehicle height valve part 53.

The first flow path portion 91 may connect the storage tank part 10 with the gear pump part 30 mounted on the housing part 20. For example, a part of the first flow path portion 91 may be mounted on any one of the storage tank part 10 and the tank port portion 22, and the remaining part of the first flow path portion 91 may be formed in the block body portion 21 and connect the tank port portion 22 and the pump port portion 24.

The second flow path portion 92 may guide the fluid having passed through the gear pump part 30. For example, the second flow path portion 92 may guide the fluid so that the fluid passes through the one or more pulsation port portions 27 formed in the block body portion 21. The second flow path portion 92 may include the pulsation inlet portion 99 and the pulsation outlet portion 98.

Meanwhile, the plurality of pulsation reducing parts 80 may be connected in series. That is, when the plurality of pulsation port portions 27 is formed in the block body portion 21, the pulsation port portions 27 are connected in series by the second flow path portion 92, such that the fluid may continuously pass through the pulsation reducing parts 80.

The third flow path portion 93 may have one end connected to the second flow path portion 92, and the other end connected to the adjustment part 70. The four adjustment parts 70 are mounted on the vehicle body, and the four third flow path portions 93 may branch off from the second flow path portion 92 and guide the fluid to the adjustment part 70.

The adjustment valve part 51 may be provided in the third flow path portion 93. The adjustment valve part 51 may control the amount of fluid to be moved to the adjustment part 70. For example, the four adjustment valve parts 51 may be respectively inserted into a first valve port portion 251 formed in an upper portion of the rear surface portion 102 among the valve port portions 25 formed in the rear surface portion 102 of the block body portion 21. The adjustment valve part 51 may be a normal closed valve. Meanwhile, a sensor port portion 28 may be formed above the first valve port portion 251, and a pressure sensor part 59 may be inserted into the sensor port portion 28 and measure the pressure of the fluid in the third flow path portion 93 or the adjustment part 70. A part of the third flow path portion 93 may connect the second flow path portion 92 and the adjustment port portion 23, and the remaining part of the third flow path portion 93 may connect the adjustment port portion 23 and the adjustment part 70.

The check valve part 52 may be disposed between the pulsation reducing part 80 and the gear pump part 30 and control the fluid movement amount. For example, the check valve part 52 may be inserted into a second valve port portion 252 formed in a lower portion of the rear surface portion 102 among the valve port portions formed in the rear surface portion 102 of the block body portion 21. The check valve part 52 may be a normal open valve and serve as a check valve for the gear pump part 30. The check valve part 52 may be a relief valve.

Meanwhile, a recovery portion 94 may be a part of the flow path portion 90 and guide the fluid having passed through the pulsation reducing part 80 to the storage tank part 10. For example, the recovery portion 94 may have one end connected to the second flow path portion 92, and the other end connected to the storage tank part 10. A part of the recovery portion 94 may be formed in the block body portion 21 and connect the second flow path portion 92 and the other of the tank port portions 22, and the remaining part of the recovery portion 94 may connect the other of the tank port portions 22 and the storage tank part 10. Therefore, the fluid bypasses the gear pump part 30 during a process of recovering the fluid having passed through the gear pump part 30, which may prevent an overload of the gear pump part 30.

The vehicle height valve part 53 may open or close the recovery portion 94. For example, the vehicle height valve part 53 may be inserted into a third valve port portion 253 formed in the lower portion of the rear surface portion 102 among the valve port portions formed in the rear surface portion 102 of the block body portion 21. The vehicle height valve part 53 may be a normal open valve. The vehicle height valve part 53 may close the recovery portion 94 to raise the vehicle height, and the vehicle height valve part 53 may open the recovery portion 94 to lower the vehicle height. In this case, the vehicle height valve part 53 may serve as a relief valve to prevent damage caused by over-pressure in the flow path portion 90.

Figure 10:
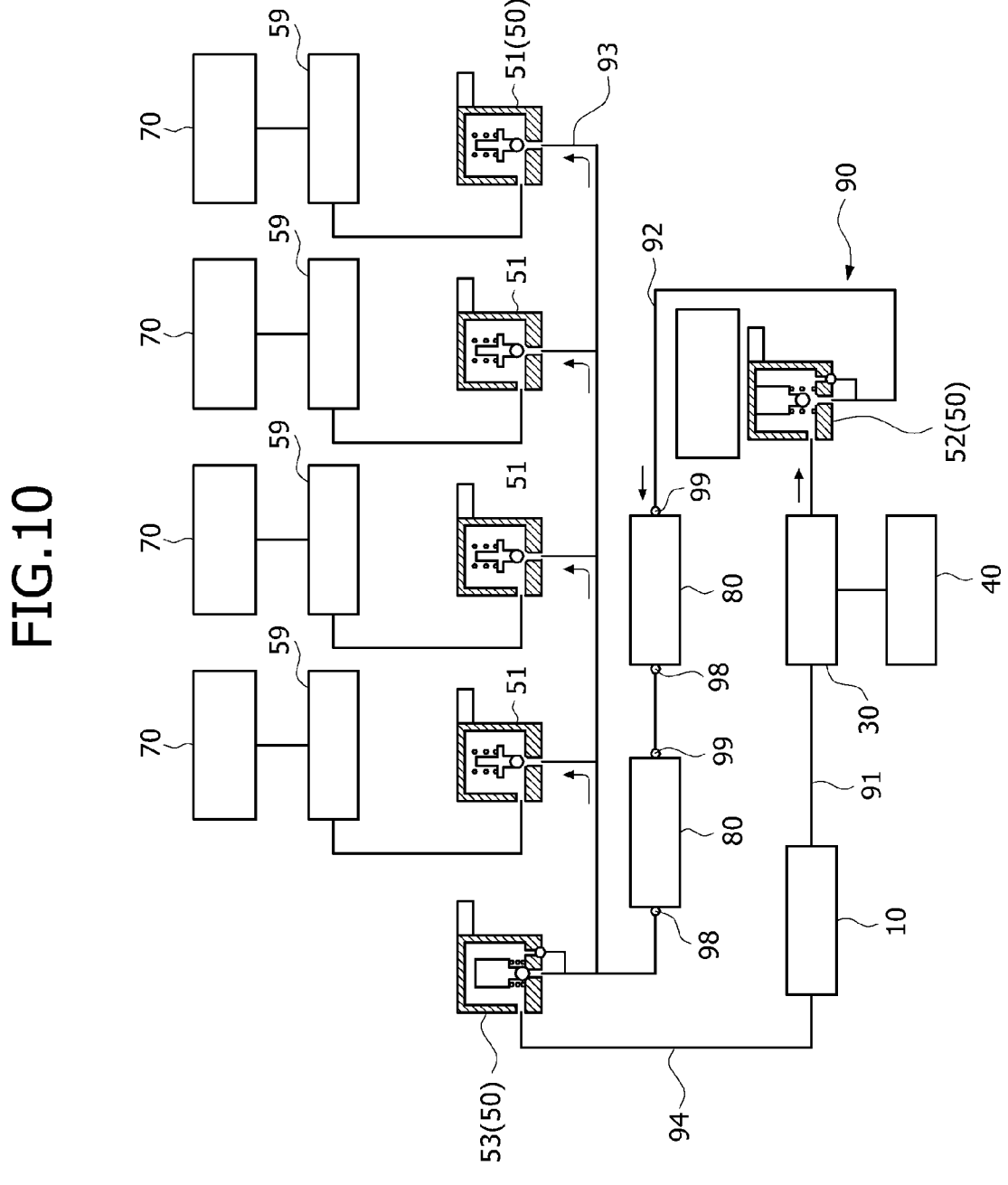
FIG. 10 is a view schematically illustrating a flow of a fluid in a vehicle height raising mode in FIG. 9.

FIG. 10 is a view schematically illustrating a flow of the fluid in a vehicle height raising mode in FIG. 9. With reference to FIG. 10, in the vehicle height raising mode, the vehicle height valve part 53 may restrict the movement of the fluid, and the check valve part 52 and the adjustment valve part 51 may allow the movement of the fluid. That is, when the vehicle height raising mode is performed, the vehicle height valve part 53 may be operated by the control part 60 to close the recovery portion 94, the check valve part 52 may be operated to open the second flow path portion 92, and the adjustment valve part 51 may be operated to open the third flow path portion 93. When the gear pump part 30 operates in the above-mentioned state, the fluid stored in the storage tank part 10 may pass through the gear pump part 30 and be amplified. The pulsation may be mitigated as the fluid passes through the pulsation reducing part 80, and then the fluid may move to the adjustment part 70 to raise the height of the vehicle body.

Figure 11:
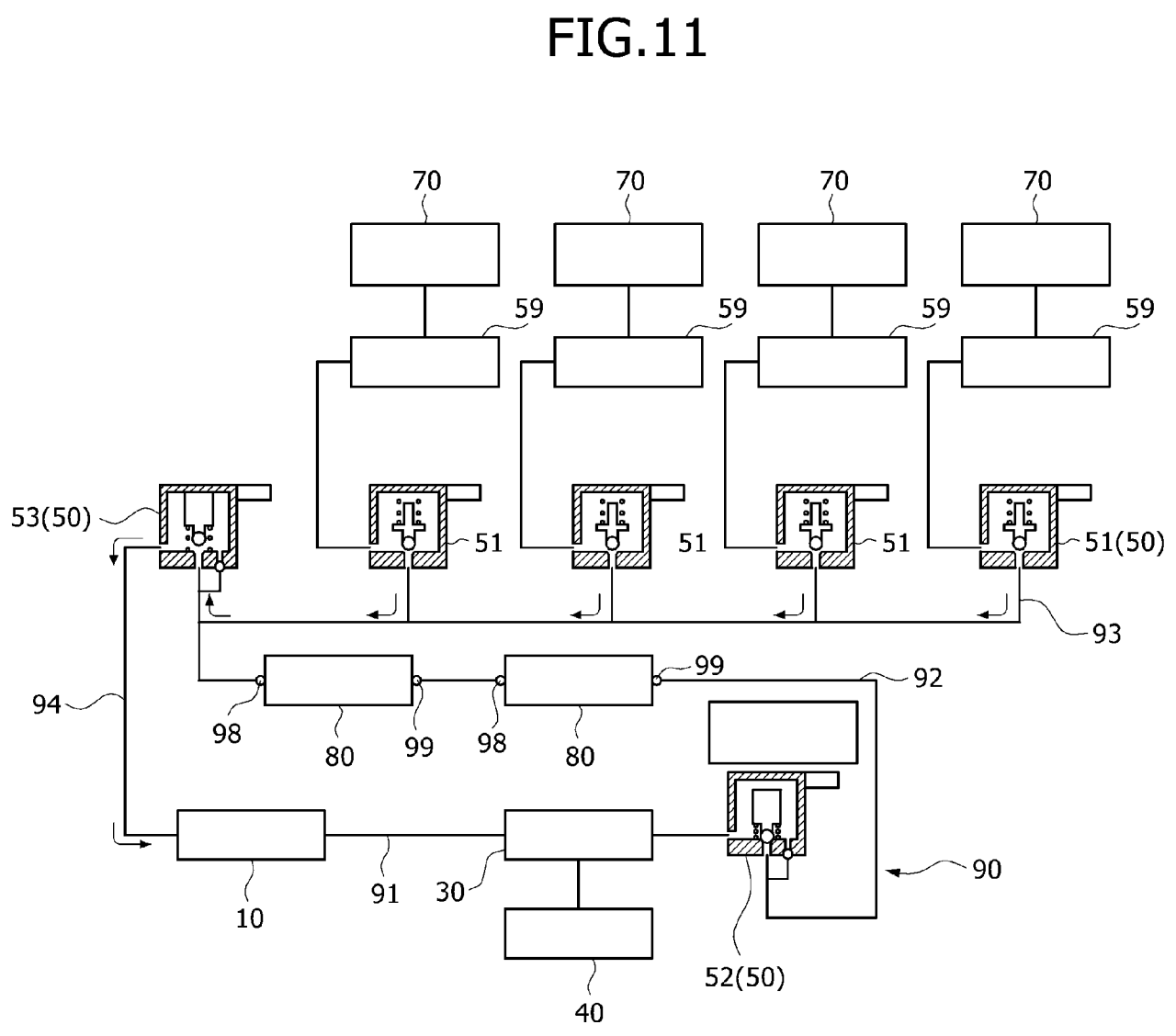

FIG. 11 is a view schematically illustrating a flow of the fluid in a vehicle height lowering mode in FIG. 9. With reference to FIG. 11, in the vehicle height lowering mode, the check valve part 52 may restrict the movement of the fluid, and the vehicle height valve part 53 and the adjustment valve part 51 may allow the movement of the fluid. That is, when the vehicle height lowering mode is performed, the check valve part 52 may be operated by the control part 60 to close the second flow path portion 92, the vehicle height valve part 53 may be operated to open the recovery portion 94, and the adjustment valve part 51 may be operated to open the third flow path portion 93. In the above-mentioned state, the fluid stored in the adjustment part may move to the storage tank part 10 through the recovery portion 94 to lower the height of the vehicle body.

Figure 12:
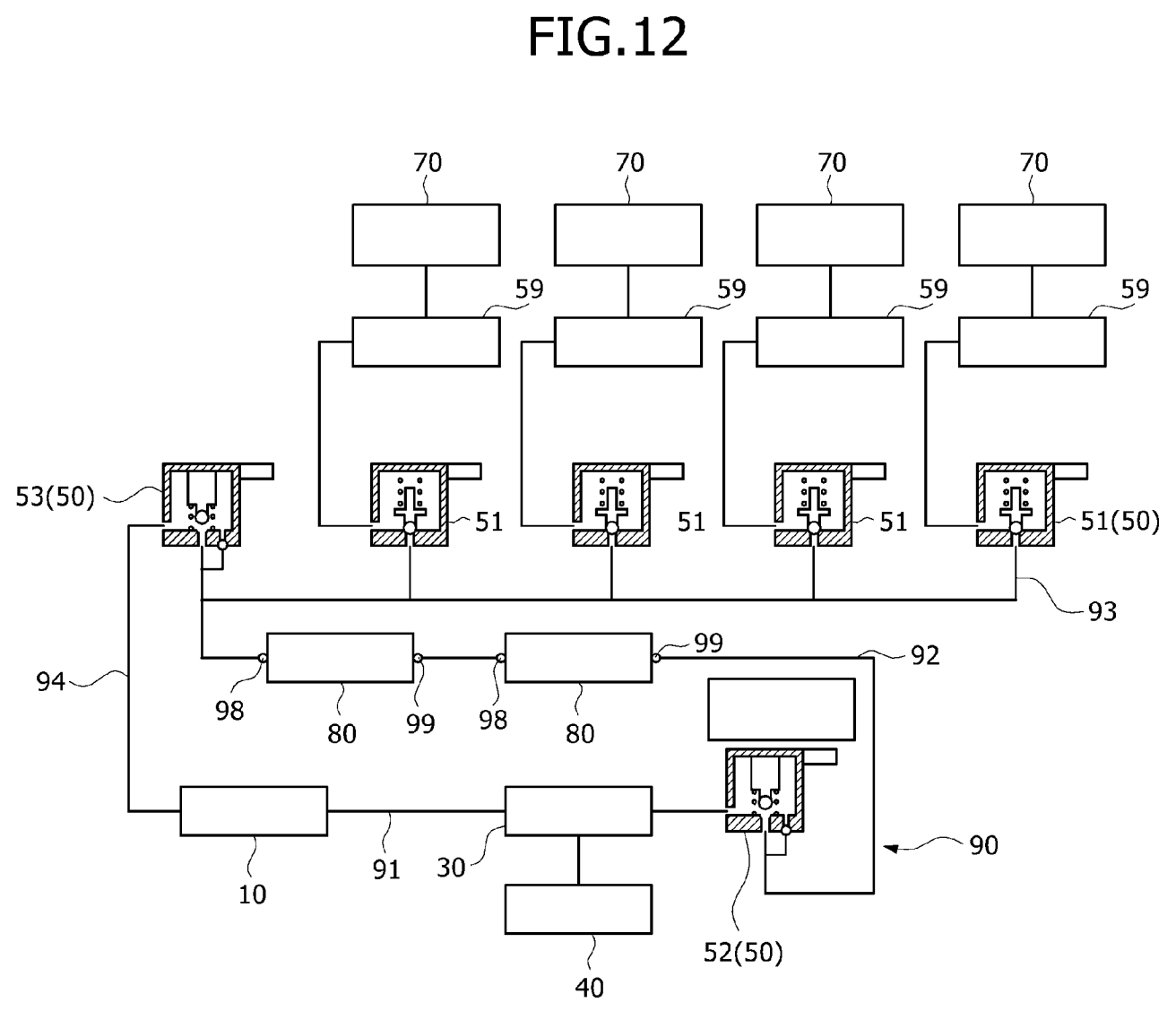

FIG. 12 is a view schematically illustrating a flow of the fluid in a vehicle height maintaining mode in FIG. 9. With reference to FIG. 12, in the vehicle height maintaining mode, the check valve part 52 and the vehicle height valve part 52 may allow the movement of the fluid, and the adjustment valve part 51 may restrict the movement of the fluid. That is, when the vehicle height maintaining mode is performed, the check valve part 52 and the vehicle height valve part 53, which are the normal open valves, may be operated to open the second flow path portion 92 and the recovery portion 94, and the adjustment valve part 51, which is the normal closed valve, may be operated to close the third flow path portion 93. Therefore, the hydraulic pressure of the adjustment part 70 may be kept constant, such that the height of the vehicle body may be maintained.

According to the hydraulic vehicle height adjustment device 1 according to the embodiment of the present disclosure, the fluid stored in the storage tank part 10 may be amplified by the gear pump part and then supplied to the adjustment part 70, thereby adjusting the height of the vehicle body and suppressing the occurrence of noise during the operating process.

While the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A hydraulic vehicle height adjustment device comprising:
   a storage tank part configured to store a fluid;
   a housing part connected to the storage tank part and configured to define a flow path portion through which the fluid moves;
   a gear pump part inserted into the housing part and having gears configured to press the fluid, wherein the gears rotate to press the fluid and discharge the fluid with increased pressure;
   an electric motor part mounted on the housing part and configured to operate the gear pump part when electric power is applied;
   an adjustment part connected to the housing part and configured to change a height of a vehicle body by using hydraulic pressure; and
   a pulsation reducing part inserted into the housing part, connected to the flow path portion, and configured to maintain a constant movement amount of the fluid, wherein the pulsation reducing part comprises:
   a reduction insertion part inserted into the housing part and configured to mitigate fluid impact while guiding the fluid, which is introduced into a pulsation inlet portion, to a pulsation outlet portion; and
   a reduction support part mounted on the housing part and configured to support the reduction insertion part.

2. The hydraulic vehicle height adjustment device of claim 1, wherein the housing part comprises:
   a block body portion;
   a tank port portion in an upper surface portion of the block body portion and configured to guide a connection with the storage tank part;
   an adjustment port portion in the upper surface portion of the block body portion and configured to guide a connection with the adjustment part;
   a pump port portion in a front surface portion of the block body portion and configured to guide the insertion of the gear pump part; and
   one or more pulsation port portions in the block body portion and configured to guide the insertion of the pulsation reducing part.

3. The hydraulic vehicle height adjustment device of claim 2, further comprising a control part mounted on the housing part, wherein the housing part further comprises a connection port portion through the block body portion and configured to guide a direct connection between the electric motor part and the control part.

4. The hydraulic vehicle height adjustment device of claim 1, wherein the gear pump part comprises:
   a pump body portion inserted into the housing part;
   a motor gear part rotatably mounted in the pump body portion and configured to rotate by being connected to the electric motor part;
   a connection gear part rotatably mounted in the pump body portion and configured to rotate while engaging with the motor gear part;

a pump inlet portion in the pump body portion and configured to guide the fluid to the motor gear part and the connection gear part; and a pump outlet portion in the pump body portion and configured to guide the fluid discharged from the motor gear part and the connection gear part.

5. The hydraulic vehicle height adjustment device of claim 4, wherein the gear pump part further comprises a pair of pump sealing parts mounted on an outer portion of the pump body portion and configured to maintain sealability, and the pump outlet portion is disposed between the pair of pump sealing parts.

6. The hydraulic vehicle height adjustment device of claim 1, wherein the reduction insertion part comprises:

an insertion pipe portion inserted into the housing part and configured to guide the fluid, which is introduced from the pulsation inlet portion, into the insertion pipe portion;

an insertion catching portion protruding outward from the insertion pipe portion and caught in the housing part; and one or more insertion discharge portions in the insertion pipe portion and configured to allow the fluid, which is introduced into the insertion pipe portion, to pass through the insertion pipe portion to an outside of the insertion pipe portion.

7. The hydraulic vehicle height adjustment device of claim 6, wherein an inner diameter of the insertion pipe portion is designed to be larger than a hole diameter of the pulsation inlet portion.

8. The hydraulic vehicle height adjustment device of claim 6, wherein at least one of the one or more insertion discharge portions is opposite to the pulsation outlet portion.

9. A hydraulic vehicle height adjustment device comprising:

a storage tank part configured to store a fluid;

a gear pump part connected to the storage tank part and having gears configured to operate to press the fluid, wherein the gears rotate to press the fluid and discharge the fluid with increased pressure;

a pulsation reducing part configured to maintain a constant movement amount of the fluid discharged from the gear pump part;

an adjustment valve part connected to the pulsation reducing part and configured to control a movement amount of the fluid to an adjustment part for changing a height of a vehicle body; and a check valve part disposed between the pulsation reducing part and the gear pump part and configured to control the movement amount of the fluid.

10. The hydraulic vehicle height adjustment device of claim 9, wherein the pulsation reducing part is provided as a plurality of pulsation reducing parts connected in series.

11. The hydraulic vehicle height adjustment device of claim 10, further comprising:

a recovery portion configured to guide the fluid, which has passed through the pulsation reducing part, to the storage tank part; and a vehicle height valve part configured to open or close the recovery portion.

12. The hydraulic vehicle height adjustment device of claim 11, wherein in a vehicle height raising mode, the vehicle height valve part restricts the movement amount of the fluid, and the check valve part and the adjustment valve part allow the movement amount of the fluid.

13. The hydraulic vehicle height adjustment device of claim 11, wherein in a vehicle height lowering mode, the check valve part restricts the movement amount of the fluid, and the vehicle height valve part and the adjustment valve part allow the movement amount of the fluid.

14. The hydraulic vehicle height adjustment device of claim 11, wherein in a vehicle height maintaining mode, the check valve part and the vehicle height valve part allow the movement amount of the fluid, and the adjustment valve part restricts the movement amount of the fluid.

15. A hydraulic vehicle height adjustment device comprising:

a storage tank part configured to store a fluid;

a housing part connected to the storage tank part and having a flow path portion through which the fluid moves;

a gear pump part inserted into the housing part and having gears configured to press the fluid, wherein the gears rotate to press the fluid and discharge the fluid with increased pressure;

an electric motor part mounted on the housing part and configured to operate the gear pump part when electric power is applied;

a valve part inserted into the housing part and configured to open or close the flow path portion; and a control part mounted on the housing part and configured to operate the valve part, wherein the hydraulic vehicle height adjustment device includes:

a pulsation reducing part inserted into the housing part, connected to the flow path portion, and configured to maintain a constant movement amount of the fluid; and a check valve part disposed between the pulsation reducing part and the gear pump part and configured to control the movement amount of the fluid, wherein the pulsation reducing part comprises:

a reduction insertion part inserted into the housing part and configured to mitigate fluid impact while guiding the fluid, which is introduced into a pulsation inlet portion, to a pulsation outlet portion; and a reduction support part mounted on the housing part and configured to support the reduction insertion part.

16. The hydraulic vehicle height adjustment device of claim 15, wherein the housing part comprises:

a block body portion;

a tank port portion in an upper surface portion of the block body portion and configured to guide a connection with the storage tank part;

an adjustment port portion in the upper surface portion of the block body portion;

a pump port portion in a front surface portion of the block body portion and configured to guide the insertion of the gear pump part;

one or more valve port portions in the block body portion and configured to guide the insertion of the valve part; and a connection port portion through the block body portion and configured to guide a direct connection between the electric motor part and the control part.

17. The hydraulic vehicle height adjustment device of claim 16, further comprising:

an adjustment part connected to the housing part and configured to change a height of a vehicle body by using hydraulic pressure, wherein the adjustment port portion is configured to guide a connection with the adjustment part.

18. The hydraulic vehicle height adjustment device of claim 15, wherein the gear pump part comprises:

a pump body portion inserted into the housing part;

a motor gear part rotatably mounted in the pump body portion and configured to rotate by being connected to the electric motor part;

a connection gear part rotatably mounted in the pump body portion and configured to rotate while engaging with the motor gear part;

a pump inlet portion in the pump body portion and configured to guide the fluid to the motor gear part and the connection gear part;

a pump outlet portion in the pump body portion and configured to guide the fluid discharged from the motor gear part and the connection gear part; and a pair of pump sealing parts mounted on an outer portion of the pump body portion and configured to maintain sealability, and wherein the pump outlet portion is disposed between the pair of pump sealing parts.

* * * * *